United States Patent [19]

Regueiro

[11] Patent Number: 5,339,776
[45] Date of Patent: Aug. 23, 1994

[54] LUBRICATION SYSTEM WITH AN OIL BYPASS VALVE

[75] Inventor: Jose F. Regueiro, Rochester Hills, Mich.

[73] Assignee: Chrysler Corporation, Highland Park, Mich.

[21] Appl. No.: 112,929

[22] Filed: Aug. 30, 1993

[51] Int. Cl.⁵ .................................................. F01M 1/16
[52] U.S. Cl. .......................... 123/196 CP; 123/196 AB
[58] Field of Search ............... 123/196 CP, 196 AB, 123/196 S, 195 C, 179.1; 184/104.2

[56] References Cited

U.S. PATENT DOCUMENTS

| | | | |
|---|---|---|---|
| 4,027,643 | 6/1977 | Feenan et al. | 123/196 AB |
| 4,616,609 | 10/1986 | Münch et al. | 123/196 AB |
| 5,220,892 | 6/1993 | Boemer | 123/196 AB |

FOREIGN PATENT DOCUMENTS

| | | | |
|---|---|---|---|
| 0054617 | 4/1980 | Japan | 123/196 AB |
| 0054618 | 4/1980 | Japan | 123/196 AB |
| 0024409 | 2/1982 | Japan | 123/196 AB |
| 727246 | 7/1991 | Japan. | |

Primary Examiner—E. Rollins Cross
Assistant Examiner—Erick Solis

[57] ABSTRACT

A lubrication system (10) has a bypass valve (34) with an inlet port (60) connected to the outlet side of the oil pump (18). The valve (34) is connected to a electronic control unit (40) that has inputs (76), (78), (80), and (82) to receive information on oil pressure, coolant temperature, oil temperature, engine speed and engine load to control the operation of an electric motor (38) which opens and closes the bypass valve (34). The oil pressure within the engine supply passage (22) is thereby controlled by the position of valve (34).

26 Claims, 2 Drawing Sheets

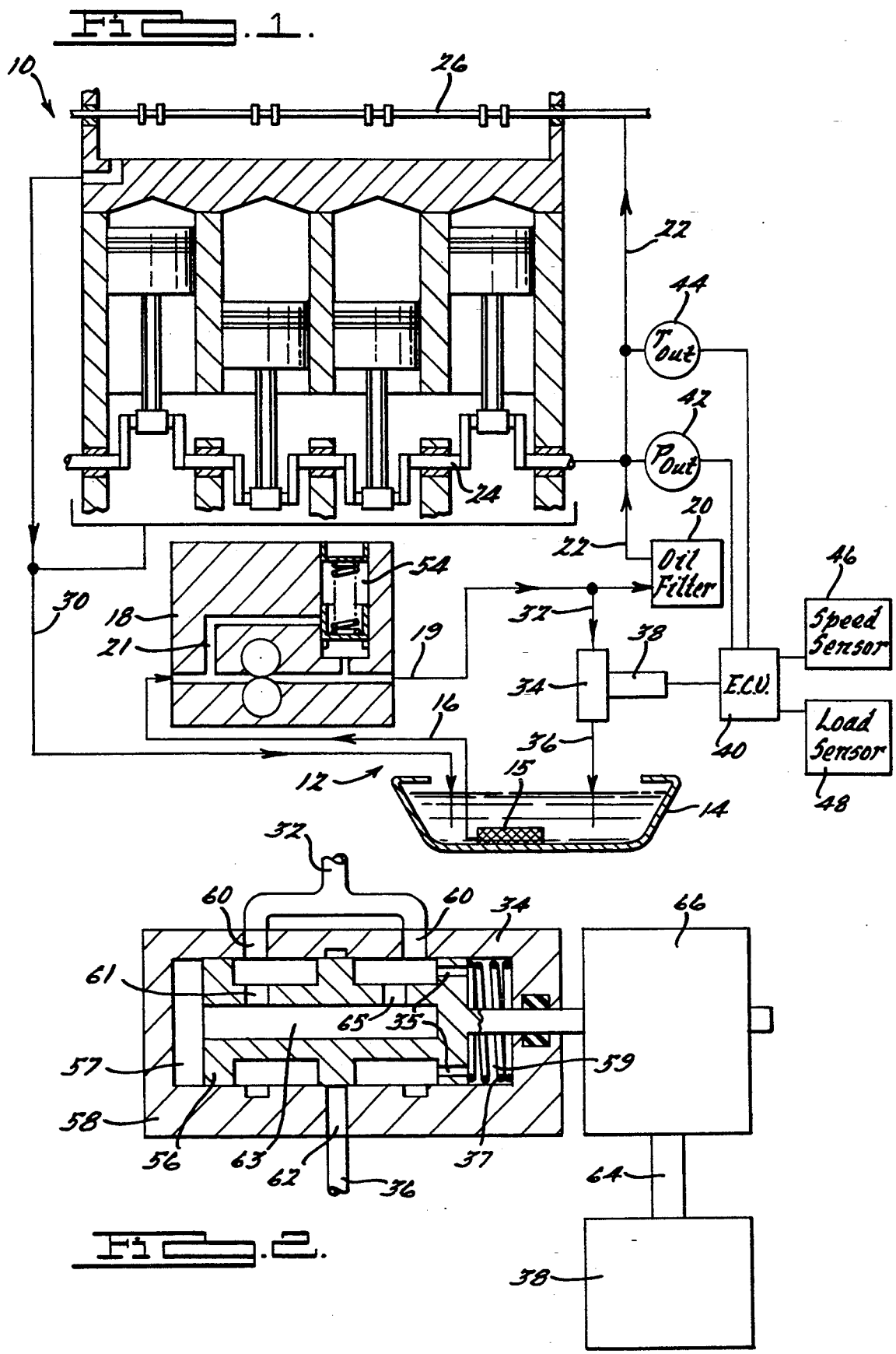

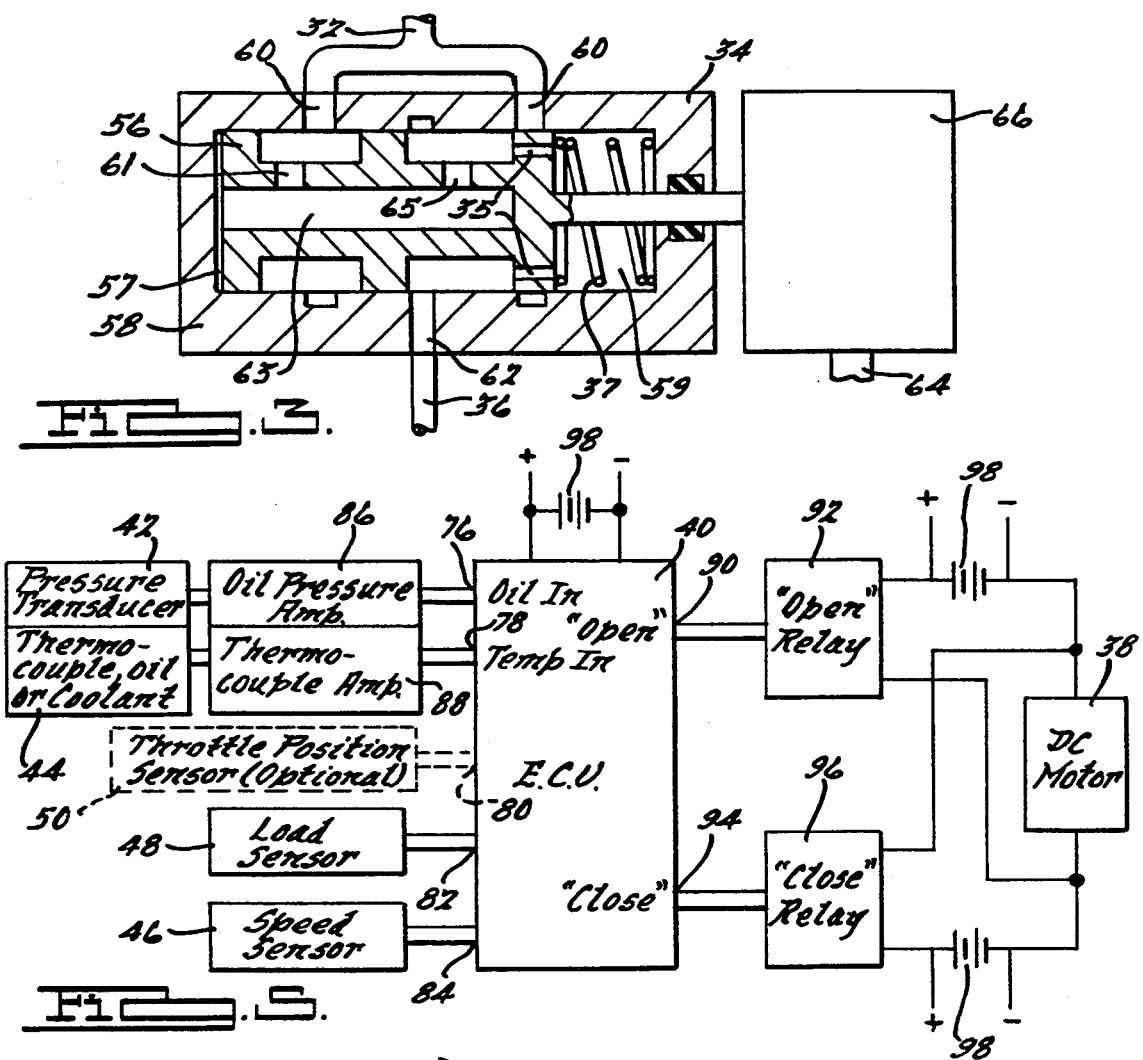
FIG. 3.
FIG. 5.
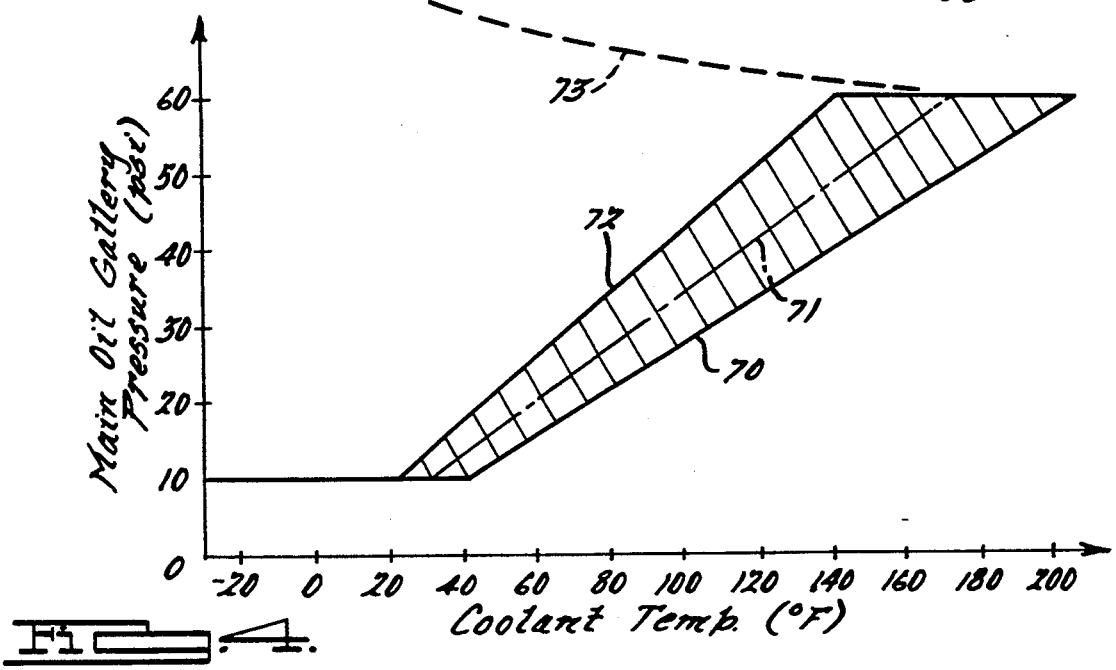
FIG. 4.

LUBRICATION SYSTEM WITH AN OIL BYPASS VALVE

TECHNICAL FIELD

The field of this invention relates to lubrication systems for internal combustion engines and more particularly to a lubrication system having a bypass valve.

BACKGROUND OF THE DISCLOSURE

Automotive engines have been developed to obtain higher horsepower in a more compact package with reduced weight. The increased horsepower and weight reduction have been achieved simultaneously with cleaner, more efficient burn and less particulate and gaseous emissions. Lower maintenance is required with modern day automotive engines. Oil changes and spark plug changes now occur at larger mileage intervals as compared to twenty years ago. Fuel efficiency has increased to provide greater mileage per gallon.

The increased horsepower in smaller packages has made it possible to reduce engine compartment sizes in small automobiles so that comfortable and relatively spacious passenger compartments can be provided. The trend has been to make even smaller engines to complement the smaller automobiles allowing even more space for passenger compartments.

While smaller engines have been developed with sufficient horsepower for highway speeds and adequate acceleration, they are more sensitive to the power drain from accessories such as cooling fans, air conditioning, automatic transmission, oil pumps, and four wheel drive. Often the power drain is sufficiently great that the acceleration during the power drain becomes unacceptable. As a result, clutches for accessories have been developed so that the accessories are not continuously and needlessly operated. Often, the clutches are designed to disconnect accessory units during acceleration or other high load conditions to lower the maximum load or torque of the engine.

Smaller batteries have also been developed to accompany the smaller engine compartments to provide starting cranking power. Often these smaller batteries have less ampere-hours and less power than larger heavier batteries and may be more easily drained if there is a problem starting the automotive engine.

Oil pressure is provided by an oil pump to circulate the oil through the engine block to lubricate the various moving parts such as the camshaft, crankshaft, pistons, and connecting rods and other various bearings. The lubrication is necessary to prevent metal to metal contact. The oil is circulated to replace the oil that is warmed and expelled from the bearings due to the heat emanating from the bearings and lubricated surfaces. If the oil is overheated, the oil viscosity becomes very low and the oil breaks down thereby allowing metal-to-metal contact between the bearing surfaces. A gear or chain driven oil pump has been traditionally used by the engine to provide flow of the oil at all times.

When the engine is fully warmed up and is at operating temperatures, the oil is hot. Consequently, the viscosity is lower, and oil flows more freely through the various bearings. Since the necessary flow of oil depends on pressure, viscosity and clearance (i.e. passage restriction), and the clearance is virtually a constant, the flow increases as the viscosity decreases and the pressure drops as the oil is warmed. Under such conditions, in order to maintain the necessary flow of oil for keeping the bearing cool enough to establish the required hydrodynamic lubrication film thickness, the pressure must be increased. That means that the size and capacity of the oil pump must be sufficient or in excess of the maximum requirement after the engine is used and partially worn, to assure the necessary flow to keep the bearings from oil starvation and mechanical failure under the worst conditions of temperature (hot) and mechanical wear (increased clearances). The oil pressure by being dependent on the speed of the oil pump, is dependent on the engine speed up to a point where a pressure regulator valve open at or near 60 psi on many engines.

When the engine is cold such as during a cold start, the oil is cold and the viscosity is high, the oil pressure provided by the oil pump is highest. However, this high oil pressure is not desired nor is it beneficial. The high viscosity and the temperatures of the cold oil makes it unnecessary for the oil pump to circulate much oil. Secondly, the oil pressure exerted by the oil pump provides resistance to the cranking of the engine during start up which provides an unnecessary power drain on the battery, lower cranking speeds and increased fuel consumption during cold operation.

All engines use a pressure-relief valve to limit the maximum line oil pressure, for the purposes of providing excess capacity to compensate for hot-oil operating conditions, and for oil which is too thin or diluted by fuel contamination and excessive clearances in the bearings. This pressure-relief valve in many cases is not sufficiently large to handle the large pressure increases at the pump head with cold oil, i.e., when the natural flow of oil past the bearings is limited by the high viscosity of the cold oil; the efficiency of the pump itself is also increased due to the reduced internal leakage. The pressure increase is further compounded by the engine being run at a high speed to promote quick engine warm-up. The applicant is aware of cases where the pump's driving torque under such conditions has been as high as eight times the normal running torque, and where very expensive failures have occurred due to oil pumps drive failure. In such cases, it has been demonstrated that dumping as much as 75% of the pump's capacity, and dumping it at the pump head, solves the problem without other detrimental effects.

Systems have been developed to vary the oil pressure dependent on the operating temperature of the engine. Some prior art systems use two pressure-operated relief valves, one at the pump discharge. Other which use multiple oil pumps provide an electrically operated on-off solenoid valve to dump the output of one of the pumps. For the larger type of automotive engines and large truck diesels operating in very cold regions, very expensive and complicated engine cranking systems are used to generate enough speed and rapidity of compression to initiate combustion. Since the oil pump in such cases requires so much torque, and since the bearings constantly being fed cold oil also increases their own oil-shear friction, dumping the line pressure during cranking in such conditions allow more cranking torque to be used to turn the engine over (crank it) faster, greatly increasing the engine's starting ability. What is needed is a economical system that reduces the pressure and flow of oil during cold engine conditions and controls the oil pressure as the engine temperatures increase.

SUMMARY OF THE DISCLOSURE

In accordance with one aspect of the invention, a lubrication system for an internal combustion engine has an oil pump, an oil pan constructed to contain a supply of oil, a supply conduit operably connecting the oil pan to the oil pump, an oil passage or main gallery leading from the oil pump to filters and lubrication locations in the internal combustion engine, and return drains leading from the lubrication locations back to the oil pan. A bypass conduit leads from the oil pump back to the oil pan bypassing the lubrication locations in the internal combustion engine. The bypass conduit includes a valve that is operable between an open position and a closed position. A controller controls the opening and closing of said bypass valve. The controller has inputs operably sensitive to oil pressure in said oil passages, and temperature of said internal combustion engine.

The valve is movable to various positions between the open and closed positions for varying the amount of oil flowing through the bypass conduit in order to control the oil pressure in the main oil gallery. The pressure in the oil gallery varies substantially linearly from a low first oil pressure at a first predetermined temperature to a higher second oil pressure at a second higher temperature for a predetermined engine speed and load. The first oil pressure and the second oil pressure are dependent on the engine speed and the engine load with an increase in engine speed and engine load increasing the oil pressure at a given temperature.

In one embodiment, the temperature of the engine is indicated by sensing the temperature of liquid coolant that cools the engine. In another embodiment, the temperature of the engine is indicated by sensing the temperature of the engine oil itself.

In an embodiment, a direct current electric motor is operable connected to the controller. The motor has a drive shaft that is operable connected to operate the valve between a full closed position and a full open position. Preferably, a gear is interposed between the drive shaft and moving valve such that the relative movement of the motor drive shaft and moving valve operate at a ratio of approximately 20–1. Alternately, a stepper motor or variable pulse width solenoid may control the flow through the valve.

Further according to another aspect of the invention, an automotive internal combustion engine has a liquid coolant system with a supply of liquid coolant for cooling said internal combustion engine. A bypass conduit leading from the oil pump back to the oil pan bypasses the lubrication locations in the internal combustion engine. The bypass conduit includes a valve that is operable between an open position and a closed position. A controller with inputs operably sensitive to oil pressure in the oil passages, and liquid coolant temperature in the water jacket controls the opening and closing of the bypass valve.

In accordance with another aspect of the invention, an automotive internal combustion engine has an oil pump, an oil pan constructed to contain a supply of oil, a supply conduit operably connecting the oil pan to the oil pump, an oil passage leading from the oil pump to lubrication locations in the internal combustion engine, return conduits leading from the lubrication locations back to the oil pan and a bypass conduit leading from the oil pump back to the oil pan bypassing the lubrication locations in the internal combustion engine. The bypass conduit includes a valve that is operable between an open position and a closed position. The controller is sensitive to oil pressure sensed in said oil passages, and oil temperature for controlling the opening and closing of said bypass valve.

Yet another very simple aspect of the invention includes a valve, directly sensitive to the oil temperature (such as a wax-expanding capsule), which opens in response to cold oil operating temperature and closes, linearly or not, as the oil itself warms up.

BRIEF DESCRIPTION OF THE DRAWINGS

Reference now is made to the accompanying drawings in which:

FIG. 1 is a schematic view of a lubrication system for an automotive engine in accordance with one embodiment of the invention;

FIG. 2 is an enlarged segmented view illustrating the bypass valve shown in FIG. 1 in a closed position;

FIG. 3 is a view similar to FIG. 2 illustrating the bypass valve in the open position;

FIG. 4 is a graph illustrating the oil pressure as a function of coolant temperature, engine speed and load; and FIG. 5 is a schematic view of an electrical circuit for controlling the electric motor for the valve shown in FIG. 1.

DETAILED DESCRIPTION OF THE PREFERRED EMBODIMENT

Referring now to FIG. 1, a schematic view of an automotive internal combustion engine 10 is shown incorporating a lubrication system generally indicated as 12. The lubrication system includes an oil pan 14 and a suction pipe 16 receiving oil through a suction filler mesh 15 and leading to an oil pump 18. The oil pump has a discharge passage or outlet 19 which leads to an oil filter 20. An oil passage or main gallery 22 leads from the filter to the crankshaft 24, camshaft 26, and other conventional bearing surfaces. The internal passages through the camshaft, crankshaft and other engine parts are conventional in structure and are not shown for simplicity of the drawing. Natural or gravity drains 30 return the oil to oil pan 14. Upstream from the oil filter 20 is a bypass line 32 which leads to a bypass valve 34 which has an outlet conduit 36 returning to oil pan 14. The valve 34 is connected to a direct current electric motor 38 that is controlled by an electronic control unit 40. The electronic control unit 40 has inputs operably connected to an oil pressure transducer 42, oil temperature or coolant temperature thermocouple 44, an engine speed sensor 46, and engine load sensor 48.

The oil pump 18 has a conventional construction incorporating a pressure regulator valve 54 to prevent excessive pressures in conduit 19 and oil gallery 22 by dumping excessive pressure back to the pump suction through passage 21.

The valve 34 and motor 38 are shown in more detail in FIG. 2. The valve 34 may have a spool 56 slidably mounted within a housing 58. The housing 58 has inlet ports 60 connected to line 32 and an outlet 62 connected to return or dump line 36. The motor 38 has a drive shaft 64 connected through a gear box 66 that linearly moves a shaft 68 that controls the position of spool 56 between the left side 57 and right side 59 of housing 58. The gear box 66 may have a ratio of approximately 20–1 so that the valve spool 56 may be precisely positioned between a full closed position as shown in FIG. 2 to a full open position as shown in FIG. 3 or in any position therebetween, by use of a smaller sized motor 38.

The spool as shown in FIG. 2 is appropriately constructed that it can be moved to a closed position whereby outlet 62 is shut off from inlet 60. When the valve is in this position, all the oil from line 19 goes through the oil filter 20 and through the oil gallery 22 and drains 30 in conventional fashion.

The valve spool 56 can also be moved to an open position as shown in FIG. 3 whereby the outlet 62 is in communication with inlet 60. The outlet 62, spool 56, inlet 60 and internal passages 61, 63 and 65 may be appropriately sized to allow most of the oil in line 19 to return to the oil pan 14 via bypass return line 36 when the valve spool 56 is in the open position.

Pressure balance holes 35 are drilled on one end of the spool valve. A spring 37 is installed on the right side 59 of the valve to help the motor move it to the open position when the oil is very cold and thick with high viscosity.

The spool can also be positioned in a transitional position such that varying amounts of oil may pass through the valve 34 to vary the pressure within the main gallery 22. An oil pressure versus coolant temperature graph is shown in FIG. 4. The electronic control unit 40 can be programmed to read the speed sensor 46, load sensor 48, and transducers 42 and 44, to control the motor 38 to produce the oil pressure graph as illustrated in FIG. 4. As the temperature goes up, the oil pressure goes up between, for example, 10 PSI and 60 PSI linearly from approximately 40° F. to approximately 200° F. as shown by line 70. The linearity is based on non-varying and minimum load and speed, and can be considered as baseline. With increased load and speed, the oil pressure at a given temperature is increased from the lowered slope line 70 to the upper sloped line 72. The lower sloped line 70 represents idle speed with no load. The intermediate sloped line 71 represents a combination of loads and speeds typical of normal highway operation. The upper line 72 represents a combination of maximum speed and load.

FIG. 5 represents the electrical circuit that controls the motor 38. The control unit 40 has inputs 76, 78, 80, 82 and 84 operably connected respectively to the oil pressure transducer or gauge 42, thermocouple or temperature gauge for the oil 44, an optional closed throttle position sensor 50, engine speed sensor 46 and load sensor 48. Appropriate amplifiers 86 and 88 may be interposed at the respective inputs.

The electronic control unit (E.C.U.) 40 is a commercially available micro-chip that can process the input signals to produce an appropriate opening signal through output 90 to an opening relay 92 or an appropriate closing signal through output 94 to closing relay 96. The relays 92 and 94 are wired to motor 38 to provide the appropriate opening or closing motion of valve 38. The ECU 40, relays 92 and 96 and motor 38 are appropriately connected to a power source 98.

An additional function can be controlled by the disclosed system based on oil temperature, engine load or throttle position and engine speed during cold decelerations. That function involves using the oil pump as a regenerative brake during the cold portion of an engine's operation while decelerating, essentially removing the brakes from a very small amount of load but more importantly, using that load to warm-up the oil faster, for improved engine fuel consumption and reduced emissions at no cost to the operator. This is accomplished by sensing throttle position with a throttle position sensor or potentiometer 50 (in extensive use today), in combination with engine speed and temperature (oil or coolant) to define a vehicle deceleration condition at any speed above idle when the oil is cooler than the maximum temperature allowed by the system (in the case herein used as example, 200° F.) and closing the valve completely to allow the maximum possible oil pressure, which in many cases may exceed the normal maximum pressure setting with hot oil (60 PSI in the example given), and generate an oil pressure line such as depicted by dashed line 73 seen in FIG. 4. This function essentially restores full oil flow but only during closed-throttle or no-load vehicle operation at cold temperatures.

Variations and modifications are possible without departing from the scope and spirit of the present invention as defined by the appended claims.

The embodiments in which an exclusive property or privilege is claimed are defined as follows:

1. In a lubrication system for an internal combustion engine having an oil pump, an oil pan constructed to contain a supply of oil, a supply passage operably connecting the oil pan to the oil pump, an oil gallery passage leading from the oil pump to lubrication locations in the internal combustion engine, and return passages leading from the lubrication locations back to the oil pan; the improvement characterized by:
   a bypass conduit leading from the oil pump back to the oil pan bypassing said lubrication locations in the internal combustion engine;
   said bypass conduit including a valve that is operable between an open position and a closed position;
   an electronic controller with inputs sensitive to oil pressure sensed in said oil passages and to temperature of said internal combustion engine, said controller controlling the opening and closing of said valve, in order to regulate oil flow through said bypass conduit.

2. A lubrication system for an internal combustion engine as defined in claim 1 further characterized by;
   said valve being movable to various positions between said open and closed position for varying the amount of oil flowing through the bypass conduit in order to control the oil pressure in the oil gallery.

3. A lubrication system for an internal combustion engine as defined in claim 2 further characterized by;
   said pressure in said oil gallery being varied by said controller substantially linearly from a low first oil pressure at a first predetermined temperature to a higher second oil pressure at a second higher temperature for a predetermined engine speed and load.

4. A lubrication system for an internal combustion engine as defined in claim 3 further characterized by;
   said controller controlling said oil pressure in said oil gallery to be dependent on said engine speed and said engine load with an increase in engine speed and engine load increasing said oil pressure at a given temperature.

5. A lubrication system for an internal combustion engine as defined in claim 4 further characterized by;
   a throttle position sensor operatively connected to said controller which closes said valve upon said throttle position sensor sensing a decelerating condition of said engine.

6. A lubrication system for an internal combustion engine as defined in claim 3 further characterized by;
said temperature of said engine being indicated by temperature of liquid coolant that cools said engine.

7. A lubrication system for an internal combustion engine as defined in claim 3 further characterized by;
said temperature of said engine being indicated by temperature of said engine oil.

8. A lubrication system for an internal combustion engine as defined in claim 1 further characterized by;
a direct current electric motor being operably connected to said controller, said motor having a drive shaft operably connected to said valve to move it between a full closed position and a full open position.

9. A lubrication system for an internal combustion engine as defined in claim 8 further characterized by;
said drive shaft being connected to said valve through a gear.

10. A lubrication system for an internal combustion engine as defined in claim 9 further characterized by;
said gear having a gear ratio approximately 20–1.

11. In an internal combustion engine having an oil pump, an oil pan constructed to contain a supply of oil, a supply passage operably connecting the oil pan to the oil pump, an oil gallery passage leading from the oil pump to lubrication locations in the internal combustion engine, return passages leading from the lubrication locations back to the oil pan, and a liquid coolant system having a supply of liquid coolant for cooling said internal combustion engine; the improvement characterized by:
a bypass conduit leading from the oil pump back to the oil pan bypassing said lubrication locations in the internal combustion engine;
said bypass conduit including a valve that is operable between an open position and a closed position;
an electronic controller with inputs sensitive to oil pressure sensed in said oil passages and to liquid coolant temperature, said controller controlling the opening and closing of said valve, in order to regulate oil flow through said bypass conduit.

12. In an internal combustion engine as defined in claim 11 further characterized by;
said valve being movable to various positions between said open and closed position for varying the amount of oil flowing through the bypass conduit in order to control the oil pressure in the oil gallery.

13. In an internal combustion engine as defined in claim 12 further characterized by;
said pressure in said oil gallery being varied by said controller substantially linearly from a low first oil pressure at a first predetermined temperature to a higher second oil pressure at a second higher temperature for a predetermined engine speed and load.

14. In an internal combustion engine as defined in claim 13 further characterized by;
said controller controlling said oil pressure in said oil passage to be dependent on said engine speed and said engine load with an increase in engine speed and engine load increasing said oil pressure at a given temperature.

15. A lubrication system for an internal combustion engine as defined in claim 14 further characterized by;
a throttle position sensor operatively connected to said controller which closes said valve upon said throttle position sensor sensing a decelerating condition of said engine.

16. In an internal combustion engine as defined in claim 11 further characterized by;
a direct current electric motor being operably connected to said controller, said motor having a drive shaft operably connected to said valve to move it between a full closed position and a full open position.

17. An internal combustion engine as defined in claim 16 further characterized by;
said drive shaft being connected to said valve through a gear.

18. An internal combustion engine as defined in claim 17 further characterized by;
said gear having a gear ratio being approximately 20–1.

19. In an internal combustion engine having an oil pump, an oil pan constructed to contain a supply of oil, a supply passage operably connecting the oil pan to the oil pump, an oil gallery passage leading from the oil pump to lubrication locations in the internal combustion engine, return passages leading from the lubrication locations back to the oil pan; the improvement characterized by:
a bypass conduit leading from the oil pump back to the oil pan bypassing said lubrication locations in the internal combustion engine;
said bypass conduit including a valve that is operable between an open position and a closed position;
an electronic controller with inputs sensitive to oil pressure sensed in said oil passages and to oil temperature, said controller controlling the opening and closing of said valve, in order to regulate oil flow through said bypass conduit.

20. In an internal combustion engine as defined in claim 19 further characterized by;
said valve being movable to various positions between said open and closed position for varying the amount of oil flowing through the bypass conduit in order to control the oil pressure in the oil gallery.

21. In an internal combustion engine as defined in claim 20 further characterized by;
said pressure in said oil gallery being varied by said controller substantially linearly from a low first oil pressure at a first predetermined oil temperature to a higher second oil pressure at a second higher oil temperature for a predetermined engine speed and load.

22. In an internal combustion engine as defined in claim 21 further characterized by;
said controller controlling said oil pressure dependent on said engine speed and said engine load with an increase in engine speed and engine load increasing said oil pressure at a given temperature.

23. A lubrication system for an internal combustion engine as defined in claim 22 further characterized by;
a throttle position sensor operatively connected to said controller which closes said valve upon said throttle position sensor sensing a decelerating condition of said engine.

24. In an internal combustion engine as defined in claim 19 further characterized by;
a direct current electric motor being operably connected to said controller, said motor having a drive shaft operably connected to said valve to move it between a full closed position and a full open position.

25. An internal combustion engine as defined in claim 24 further characterized by;

said drive shaft being connected to said valve through a gear.

26. An internal combustion engine as defined in claim further characterized by;

said gear having a gear ratio of approximately 20-1.

* * * * *